Figure 1:
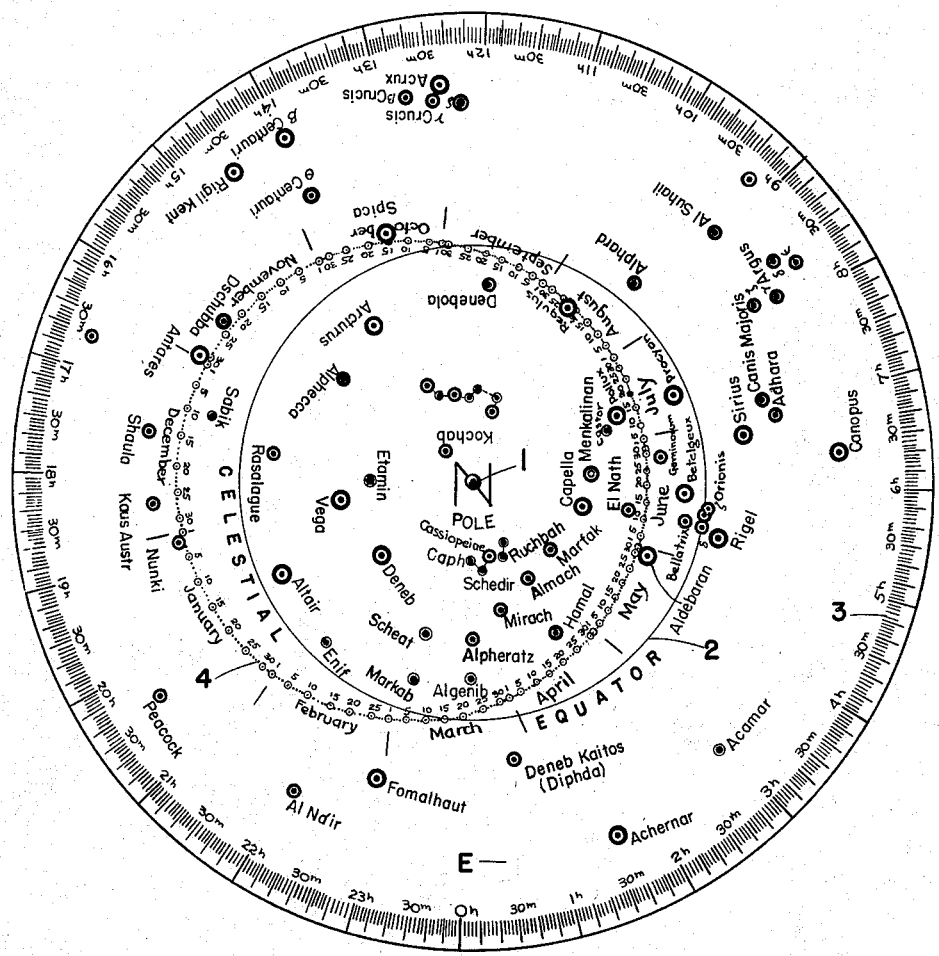

March 6, 1951     G. W. D. WALLER ET AL     2,543,815
STAR FINDER

Filed Aug. 21, 1946     2 Sheets—Sheet 1

Inventors
GEORGE W.D. WALLER
ALTON B. MOODY

By M.O. Hayes

Attorney

March 6, 1951     G. W. D. WALLER ET AL     2,543,815
STAR FINDER
Filed Aug. 21, 1946     2 Sheets-Sheet 2

Inventors
GEORGE W. D. WALLER
ALTON B. MOODY

Patented Mar. 6, 1951

2,543,815

UNITED STATES PATENT OFFICE 2,543,815

STAR FINDER

George W. D. Waller and Alton B. Moody, Annapolis, Md.

Application August 21, 1946, Serial No. 691,892

1 Claim. (Cl. 35—44)

(Granted under the act of March 3, 1883, as amended April 30, 1928; 370 O. G. 757)

Our invention relates to star finders used for locating and identifying navigational stars and planets for use in determining position by observation.

Previously available star finders have required the use of an almanac or other source of information or computation. If this was not necessary for determining the actual setting of the star finder, it was needed for determining the time of sunrise and sunset and the limits of twilight. That is, it was needed for determining the period during which both stars and horizon are available for observation. Our invention overcomes this difficulty by showing the mean position of the true sun for each day of the year on the base plate and providing a curve on each template to represent the horizon, corrected for mean refraction, mean semi-diameter, and mean parallax of the true sun and another curve to represent a line 10° below the horizon.

The principal object of our invention is to provide a means for determining the approximate altitude and azimuth of stars without reference to an almanac or any other source of information other than our invention, and without computation.

A further object of our invention is to provide a means for determining the approximate altitude and azimuth of the true sun at any time without reference to an almanac or any other source of information other than our invention, and without computation.

A further object of our invention is to provide a means for determining the approximate altitude and azimuth of the moon and the navigational planets at any time without reference to an almanac or any other source of information other than our invention, and without computation.

A further object of our invention is to provide a means for identifying any navigational celestial body which has been observed without reference to an almanac or any other source of information other than our invention, and without computation.

A further object of our invention is to provide a means for determining the local civil time of sunrise and sunset to practical navigational accuracy without reference to an almanac or any other source of information other than our invention, and without computation.

A further object of our invention is to provide a means for determining the local civil time of moonrise and moonset to practical navigational accuracy without reference to an almanac or any other source of information other than our invention, and without computation.

A further object of our invention is to provide a means for determining the local civil time of beginning of morning observational twilight and ending of evening observational twilight to practical navigational accuracy without reference to an almanac or any other source of information other than our invention, and without computation.

A further object of our invention is to provide a means for determining the local civil time of meridian transit of the true sun to practical navigational accuracy without reference to an almanac or any other source of information other than our invention, and without computation.

A further object of our invention is to provide a means for determining the local civil time when the true sun will be on the prime vertical to practical navigational accuracy without reference to an almanac or any other source of information other than our invention, and without computation.

A further object of our invention is to provide a means for determining the amplitude of the true sun to practical navigational accuracy without reference to an almanac or any other source of information, other than our invention, and without computation.

A still further object of our invention is to facilitate the making up of navigational problems based on actual situations at sea.

The above mentioned objects of our invention may be better understood by reference to the following description based on the accompanying drawings, in which Fig. 1 illustrates the northern hemisphere side of the base plate.

Figure 2:
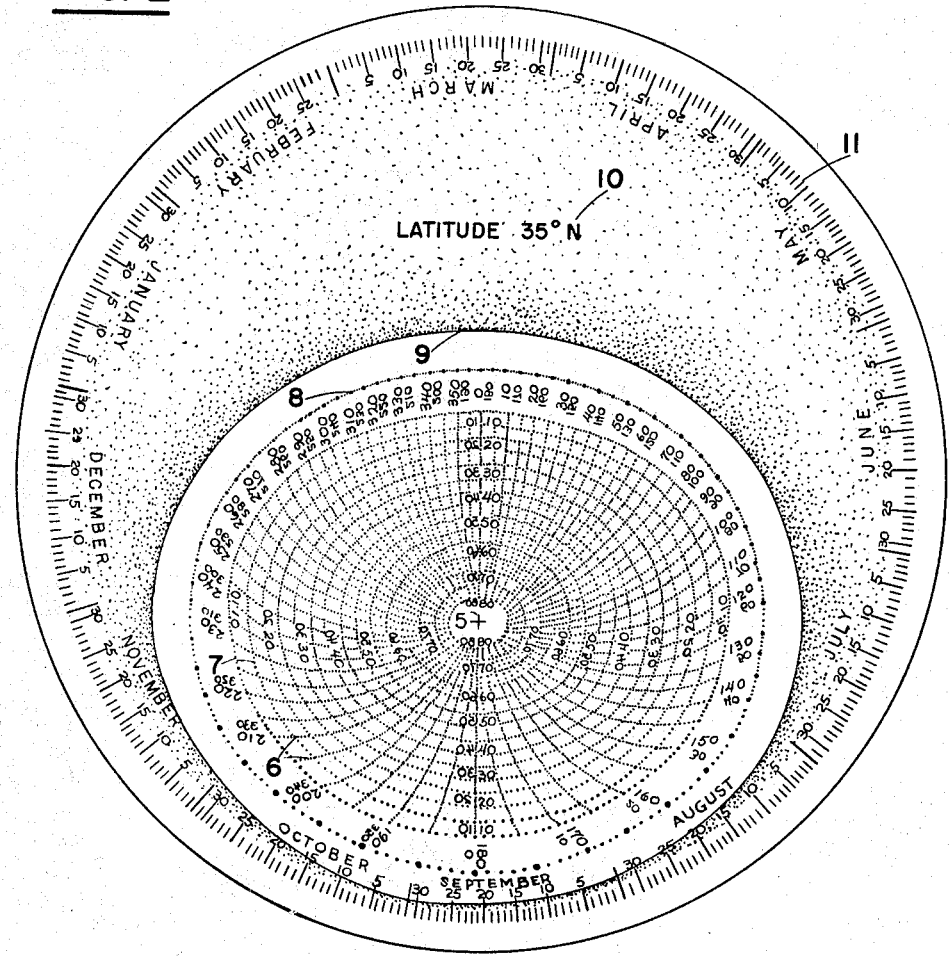

Fig. 2 illustrates the template for latitude 35° north or south, the north side being shown uppermost.

In Fig. 1 it can be seen that the base plate consists of a disk on which is shown the various navigational stars in proper relation to each other. The coordinates for plotting the positions are declination and right ascension. The center of the diagram 1 represents the north celestial pole. The solid circle 2 with the pole as a center represents the celestial equator. Stars inside the circle are of northern declination. The polar azimuthal equidistant projection is used, so that declination changes in equal increments along a radius from the pole. Right ascension is determined by means of a scale 3 around the outer edge of the base plate.

The mean position of the true sun for each day of a normal year is shown at 4, using the same coordinates used for the stars.

The scale 3 around the outer edge of the base plate divides the periphery into 24 hours of equal length and each hour is further divided into 2 minute intervals. The $0^h$ point of this scale indicates the position of the hour circle of the vernal equinox.

On the reverse side of the disk a similar plot is made with the south celestial pole at the center. Hence, stars within the circle on the south side are of south declination.

The base plate is made of white opaque plastic material.

Fig. 2 illustrates one of a series of templates made of transparent plastic. Each template is made for a specific latitude and can be used for any latitude within a few degrees of that for which the template is made. The template illustrated is made for latitude 35° north or south, the north side being illustrated.

From Fig. 2 it can be seen that two families of curves are drawn on the template. Each template is of the same diameter as the base plate. When a template is placed over the base plate and centered thereon, the cross (+) 5 at the common origin of both families of curves will be over a diurnal circle, or circle of equal declination equal to the latitude for which the template is made. It will thus mark the zenith of some point on that parallel of latitude at any given time.

The curves 6 radiating from the zenith indicate azimuth from the point on the earth having that zenith. These curves are not solid lines, but are composed of dots, 1° apart in altitude, to facilitate estimation of altitude. These curves are 10° of azimuth apart near the center and 5° of azimuth apart below 70° altitude. Each 10° curve is labeled.

The curves resembling circles 7 indicate altitude above the horizon. These curves are also made of dots. At altitude 75° and 80° these dots are 5° of azimuth apart. Between altitudes 55° and 70° they are 2.5° apart. For altitude 50° and less the dots are 1° of azimuth apart. The dots facilitate accurate estimation of azimuth. Altitude curves are shown for each 5° of altitude between 10° and 80°. Each 10° curve is labeled.

Since celestial bodies are not usually observed when their altitude is less than 10°, no curve for an altitude of 5° is shown. The azimuth lines terminate at altitude 10°. The horizon 8 is formed of dots 1° of azimuth apart to facilitate reading of amplitude. The dot for each 5° of azimuth is larger than the others. The azimuth labels are placed between the horizon and altitude 10° curve in such manner as to serve as labels for both the azimuth lines and the dots of the horizon.

The altitude curves 7 indicate the angular distance of a celestial body above the celestial horizon. The curve representing the horizon, however, is offset a sufficient amount to allow for mean refraction and mean semi-diameter and mean parallax of the true sun, so as to indicate the time of visible sunrise and sunset.

The outer solid curve 9 not reached by azimuth lines represents a negative altitude of 10°. That is, this curve is the locus of all points 10° below the horizon. The pupose of this curve is to mark the position of the sun at the beginning of morning observational twilight and the ending of evening observational twilight.

Each family of curves is provided with two sets of labels. When the template is placed with the north side uppermost, as shown, the correct figures to be used for north latitude appear in their proper form, the others being backwards. When the south side is placed uppermost, the correct figures for south latitude appear in their proper form, the others being backwards. The side placed uppermost is indicated by the label 10.

A scale near the outer edge of the template 11 is divided into 365.24 equal divisions, each division representing one day of a year. The large space (1.24 times the width of the others) occurs between February 28 and March 1. On leap years February 29 is spotted by eye midway between February 28 and March 1. This scale is so placed that it will not interfere with the reading of the scale on the base plate when the template is placed over the base plate. This scale is placed in such a position that the average date of the autumnal equinox appears on the line marking the upper branch of the meridian, the 0°–180° azimuth line.

That part of each template between the twilight limit curve and the scale near the outer edge is opaque. The area between the twilight limit curve and the horizon is shaded, the darkest part being near the twilight limit curve. That part of the template within the horizon curve and over the date scale is clear.

Templates are made for each 10° of latitude from 5° to 85°, nine in all.

It is common practice among navigators to prepare in advance a list of navigational stars that are expected to be available during the sight taking period. This list is usually prepared by determining by means of an almanac the time of sunrise or sunset and then determining the approximate altitude and azimuth of navigational stars by properly orienting a star finder for some arbitrarily chosen time during twilight.

Our star finder is oriented without reference to an almanac or other source of information or computation by selecting the template for the latitude nearest the estimated position of the ship at the sight taking time and centering it over the base plate, being careful to place the correct side of the template uppermost. The template is then rotated until the plotted position of the sun for the date involved appears between the horizon and twilight curves. For morning twilight the curves towards the east are used and for evening twilight the curves towards the west are used. The direction is indicated by the azimuth curves, an azimuth of 90° indicating due east and an azimuth of 270° indicating due west. If knowledge of the positions of the stars is desired for the middle of twilight, the template is rotated until the plotted position of the sun appears midway between the horizon and twilight limit curves on the template. If knowledge of the positions of the stars is desired for a time nearer either limit of twilight, the template is rotated until the plotted position of the sun appears in the desired position with reference to the limits.

If it is desired to orient the template for any given time, the template is rotated until the given date on the template appears over the local civil time on the base plate.

When the template is properly oriented by either method, the stars within the horizon curve will be visible above the observer's horizon. The approximate altitude and azimuth of any desired visible navigational star can then be estimated by reference to the curves.

When a template is properly centered, the altitude of the pole will be equal to the latitude for which the template is made. Greater accuracy can be obtained by offsetting the template along the 0°–180° azimuth line until the altitude of the pole is equal to the exact latitude of the estimated position of the ship. This refinement is not needed in ordinary practice.

The approximate altitude and azimuth of the sun at any time during the day can be determined by orienting the template for the desired local civil time, as explained above, and estimating the altitude and azimuth as for a star, but using the plotted position of the sun for the given date.

This information is useful in determining when to observe the sun to obtain certain desired information from the observation (such as when the resultant line of position will be parallel to the course, coast line, or a shoal, when it will be perpendicular to one of these, etc.), and how long a time must elapse between observations to obtain a desired change in azimuth (or the direction of the resulting lines of position) at various times of the day.

The positions of the navigational planets and the moon can be plotted on the base plate from time to time, using declination and right ascension, as determined from an almanac, and their approximate altitudes and azimuths determined as for a star. However, an easier method of doing this is given below.

If a star has been observed and its identity is desired, the star finder can be oriented for the time of observation of the star, as described above, and the star identified by comparing its observed altitude and azimuth with those of the plotted stars, as indicated by the curves.

The local civil time of sunrise and sunset can be determined to an accuracy of about one minute at the template latitude. This is done by centering the correct template over the base plate and rotating it until the horizon curve appears over the plotted position of the sun for the given date. The local civil time can then be read on the base plate under the given date on the template.

Between template latitudes results a little less accurate than obtainable at template latitudes can be obtained by offsetting the template as explained above. For more precise results readings can be made with two templates and an interpolation made. Such accuracy is not needed for practical navigation.

The local civil time of moonrise or moonset can be determined by using the plotted position of the moon in the same manner described for the sun. Interpolation for longitude can be made by eye interpolation between plotted positions, if desired.

The local civil time of beginning of morning twilight and ending of evening twilight can be determined in a manner similar to finding the time of sunrise and sunset, by using the limit of twilight curve instead of the horizon curve. The twilight thus determined is termed observational twilight. This is the limit of good sight-taking visibility of the horizon when the sky is clear and visibility is good. The limit thus given is an average value for morning and evening twilight determined by experimentation at sea.

The value of observational twilight cannot be found directly from the almanac or other sources. The astronomical twilight of the nautical almanac and the civil twilight of the air almanac are of little use to the navigator, for they fail to inform him of the practical limits of his observational period. By means of our star finder the navigator can determine easily and quickly when he can expect to begin getting sights in the morning and by allowing the desired time for preparing to take sights can determine when to be called.

The local civil time of meridian transit of the true sun can be determined to an accuracy of about one minute by centering the template on the base plate and rotating it until the 0°–180° azimuth line appears over the plotted position of the sun for the given date. The local civil time can then be read on the base plate under the given date on the template. It is common practice among navigators to compute the time of meridian transit and observe the sun at this time to obtain the latitude for the noon position. The accuracy of the computation depends on the accuracy with which the longitude is known. Since this is seldom known exactly, it is often necessary to make several observations starting a little before the predicted time and continuing until the navigator is certain he has observed the greatest altitude of the sun. Even if the exact time of meridian transit is known, many navigators prefer to make a series of observations instead of a single observation taken at the predetermined instant, for such an observation is likely to be less accurate than one taken in the usual manner. Our star finder makes it possible to determine the time of meridian transit to sufficient accuracy for practical navigation without computation, almanac, or any other source of information.

The local civil time when the true sun will be on the prime vertical can be determined by centering the template over the base plate and rotating it until the 90° or 270° azimuth line appears over the plotted position of the sun for the given date. The local civil time can then be read on the base plate under the given date on the template. This information is useful to the navigator in checking the accuracy of the compass, for the sun's azimuth is changing at a slower rate when it is on the prime vertical than at any other time of the day.

The amplitude at sunrise or sunset can be determined by centering the correct template over the base plate and rotating it until the horizon on the template appears over the plotted position of the sun for the given date. The azimuth can then be read off to about a quarter of a degree by means of the dots of the horizon. The azimuth can then be converted mentally to amplitude or used as it is. Many navigators prefer to check the accuracy of the compass at this time.

The instructor will find our star finder invaluable, as have the inventors, in making up problems involving not only sights of the sun, but other bodies as well.

The need for the navigator's plotting the positions of the moon and navigational planets from time to time on the base plate is eliminated by printing the base plate on cardboard or other expendable material and each month overprinting the correct positions of the moon and navigational planets for suitable intervals during the month, using a suitable color scheme to avoid confusion, but avoiding any color that is hard to see in the dim colored light of a chart house or pilot compartment of a plane. The subscriber to these monthly base plates can use the templates of his permanent star finder as described above, substituting the current monthly base plate for his permanent one.

Either in place of or in addition to the monthly base plate mentioned above the base plate information, including the overprint information, can be printed on a good grade of paper and bound as a publication, the monthly base plates for any desired period, such as a year, being bound into one volume. By making this the same size as the nautical almanac or air almanac, and providing templates the same size, to fit in a pocket inside the front or back cover, this can be added to the almanac or made available as a separate publication to replace the inadequate "Sky Diagrams."

The monthly base plate is not illustrated.

Local civil time can be converted mentally to zone time by methods well known among navigators.

Thus, the unique and ingenious features of our invention facilitate the daily work of the navigator at sea or in the air.

It should be distinctly understood that the description we have given above and the accompanying drawings include only the general and preferred embodiments of our invention and are not intended to limit the scope of our invention, nor to prevent our making any changes within the scope of the appended claim.

Our invention described herein may be manufactured and used by or for the Government of the United States of America for governmental purposes without the payment of any royalty thereon.

We claim:

In a finder for celestial bodies: a circular base plate having around its circumference an hour scale with its zero point positioned so that it may indicate the hour circle of one equinox; a celestial pole for one hemisphere indicated at the center point of said base plate; navigational stars of said hemisphere indicated in polar azimuthal equidistant projection on said base; a celestial equator circle centered at said pole; a circular sun scale arranged to indicate the mean position of the true sun for each day of a year; and a circular transparent template substantially equal in size to said base plate; said template being adapted for relative rotation in superposed relationship upon said base plate; said template having thereon: a circular date scale spaced slightly from the periphery of said template and a grid containing two families of curves respectively representing altitudes and azimuths at a specific latitude in said hemisphere; one of said altitude curves indicating the horizon line and another of said altitude curves representing a sub-horizon line indicating the darker limit of twilight; said second date scale being positioned so that the average date of the other equinox will appear on the 0° to 180° azimuth line in said grid, whereby the relation between the positions of said celestial bodies and any hour of local civil time may be indicated by rotation of said template upon said baseplate.

GEORGE W. D. WALLER.
ALTON B. MOODY.

REFERENCES CITED

The following references are of record in the file of this patent:

UNITED STATES PATENTS

| Number | Name | Date |
|---|---|---|
| 832,527 | Barritt | Oct. 2, 1906 |
| 1,401,446 | Rude | Dec. 27, 1921 |
| 1,873,595 | Johnson | Aug. 23, 1932 |
| 2,304,797 | Collins | Dec. 15, 1942 |
| 2,337,545 | Collins | Dec. 28, 1943 |
| 2,478,981 | Randall | Aug. 16, 1949 |